(No Model.)
W. CHRISTIE.
PISTON PACKING.
No. 447,007. Patented Feb. 24, 1891.
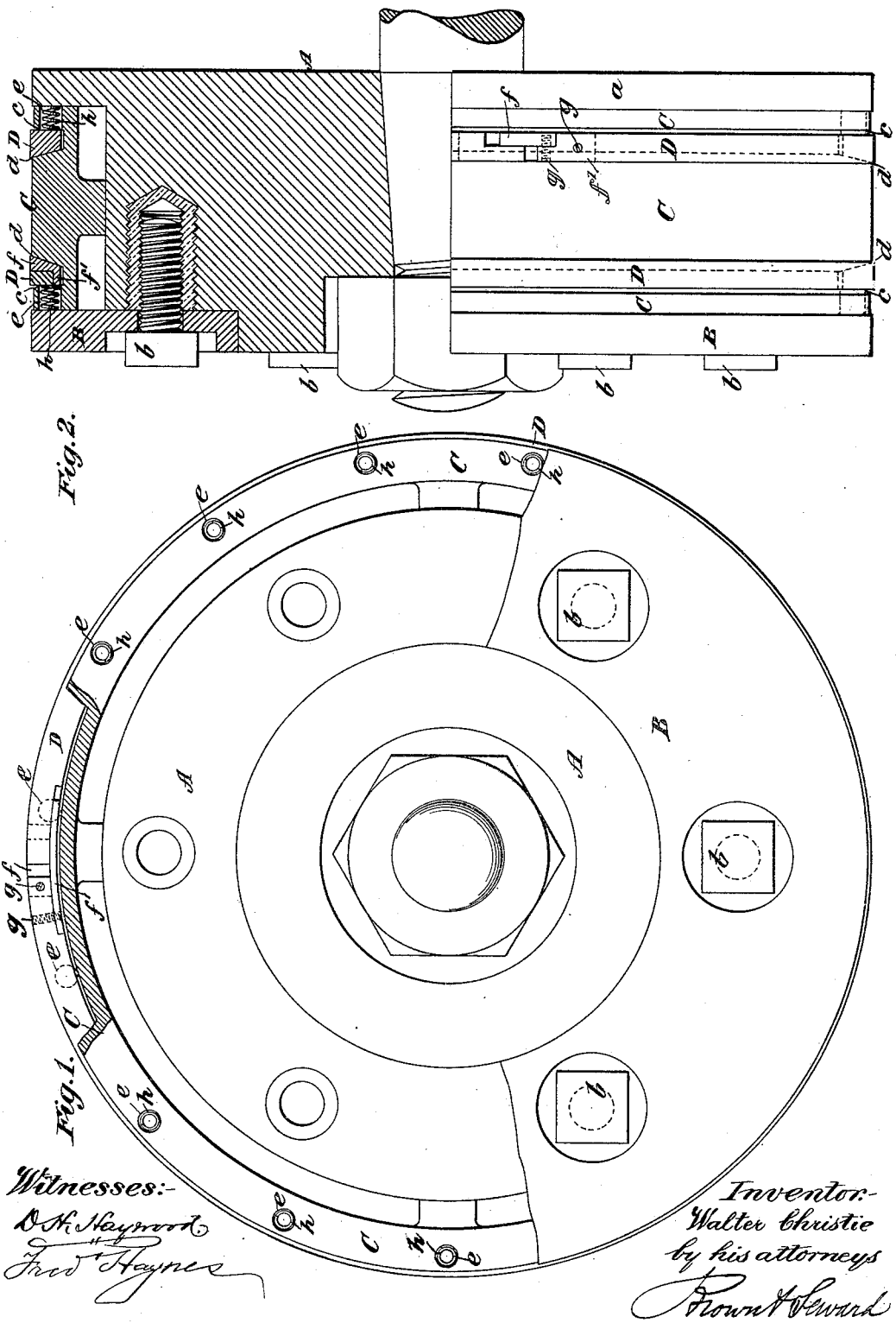

UNITED STATES PATENT OFFICE.

WALTER CHRISTIE, OF NEW YORK, N. Y.

PISTON-PACKING.

SPECIFICATION forming part of Letters Patent No. 447,007, dated February 24, 1891.

Application filed May 27, 1890. Serial No. 353,290. (No model.)

*To all whom it may concern:*

Be it known that I, WALTER CHRISTIE, of the city and county of New York, in the State of New York, have invented a new and useful Improvement in Piston-Packing, of which the following is a specification.

I will proceed to describe my invention with reference to the accompanying drawings, and afterward point out its novelty in the claims.

Figure 1 is a face view of the piston having a part of the follower broken away and representing a part of the bull-ring in section. Fig. 2 is a side view half in section.

Similar letters of reference designate corresponding parts in both the figures.

A designates the piston-head having a circumferential flange $a$ on one face and fitted on the other face with a follower B, which is secured to it by bolts $b$ in a well-known manner.

C is a bull-ring, which is solid or undivided in its circumference and fitted to the head A between the flange $a$ and the follower B. In this bull-ring there are represented two circumferential grooves $c\ d$, the inner sides $d$ of which are represented as beveled or conical and the outer sides $c$ of which are shown flat. In the outer side faces of the said ring there are a series of holes $e$, situated at short distances apart in a circle concentric with the ring and communicating with the interior of the grooves $c\ d$.

D D are expanding packing-rings contained within and conforming to the grooves $c\ d$ in the bull-ring, the inner faces of the said rings being therefore beveled or conical. These rings are cut at one point in their circumference and are each fitted at the cut with a tongue-piece $f$, having a flange $f'$. This tongue-piece is such as is commonly used to close the joint in expanding packing-rings, and is secured to the ring on one side of the joint or cut by means of screws $g$.

$h\ h$ are spiral springs inserted in the holes $e$ of the packing-ring and abutting against the inner faces of the flange $a$ and the follower B, respectively, and against the outer faces of the packing-rings. These springs serve to press the packing-rings against the conical shoulders $d$, constituted by the inner sides of the grooves in the bull-ring, and the pressure produced by the beveled or inner faces of the packing-rings against the said shoulders $d$ tends to expand the packing-rings with a force sufficient to make a tight fit between the said rings and the cylinder to which the piston is applied, and thereby preserve a tight-working fit.

What I claim as my invention, and desire to secure by Letters Patent, is—

1. The combination, with the flanged piston-head, a follower fitted thereto, and a bull-ring arranged between the flange of the piston-head and the follower and having a beveled shoulder, of an expanding packing-ring surrounding the bull-ring and having a beveled face conforming to the beveled shoulder of the bull-ring and interposed between the said shoulder and follower or flanged piston-head, and a series of coil-springs arranged at intervals in the circumference of the packing-ring directly between the said ring and the follower or flange of the piston-head, substantially as herein described.

2. The combination, with the flanged piston-head, a follower fitted thereto, and a bull-ring having in its circumference a groove of which one side is beveled and the opposite side contains a series of holes open to one side of the exterior of the said ring, of an expanding packing-ring contained within and conforming to said groove in the bull-ring, and a series of spiral springs arranged in the said holes and each abutting at one end against the packing-ring and at the other end against the follower or flange of the piston-head, substantially as herein set forth.

3. The combination, with the flanged piston-head, a follower fitted thereto, and a bull-ring having two beveled shoulders presented in opposite directions, of two expanding bevel-faced packing-rings applied one outside of each of said shoulders, and spiral springs abutting directly against said packing-rings and against the follower and flange of the piston-head, substantially as herein described.

WALTER CHRISTIE.

Witnesses:
FREDK. HAYNES,
D. H. HAYWOOD.